(12) United States Patent
Emtman et al.

(10) Patent No.: US 9,347,757 B2
(45) Date of Patent: May 24, 2016

(54) WHEEL ASSEMBLY FOR MOVING CALIPER JAW WITH REPEATABLE FORCE

(71) Applicant: Mitutoyo Corporation, Kanagawa-ken (JP)

(72) Inventors: Casey E. Emtman, Kirkland, WA (US); Michael Edward Goldsworthy, Seattle, WA (US); William Randall Garrity, Bremerton, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 176 days.

(21) Appl. No.: 14/194,461

(22) Filed: Feb. 28, 2014

(65) Prior Publication Data

US 2015/0247717 A1 Sep. 3, 2015

(51) Int. Cl.
*G01B 3/20* (2006.01)

(52) U.S. Cl.
CPC ........... *G01B 3/205* (2013.01); *Y10T 74/18568* (2015.01)

(58) Field of Classification Search
CPC ................................. G01B 3/20; G01B 3/205
USPC ............ 33/783, 784, 810, 811, 812, 819, 823
See application file for complete search history.

(56) References Cited

U.S. PATENT DOCUMENTS

| | | | |
|---|---|---|---|
| 517,208 A | 3/1894 | Billings | |
| 2,741,848 A | 4/1956 | Livingston | |
| 2,952,916 A | 9/1960 | Germann | |
| 3,113,384 A | 12/1963 | Keszler | |
| 3,742,609 A | 7/1973 | Jeannet et al. | |
| 4,873,771 A | 10/1989 | Wust | |
| 5,029,402 A | 7/1991 | Lazecki et al. | |
| 5,483,751 A * | 1/1996 | Kodato | G01B 3/20 33/794 |
| 5,574,381 A | 11/1996 | Andermo et al. | |

(Continued)

FOREIGN PATENT DOCUMENTS

| | | | | |
|---|---|---|---|---|
| GB | 1135553 A | * | 12/1968 | ............... G01B 3/20 |
| WO | WO 8601285 A1 | * | 2/1986 | ............... G01B 3/20 |

OTHER PUBLICATIONS

U.S. Appl. No. 14/194,320, filed Feb. 28, 2014, entitled "Displacement Sensor for Force Indicating Caliper," 59 pages.

(Continued)

*Primary Examiner* — R. A. Smith
(74) *Attorney, Agent, or Firm* — Seed IP Law Group PLLC

(57) ABSTRACT

A compliant wheel assembly is provided for moving a caliper jaw relative to a caliper spar. The wheel assembly includes a rotary bearing member, a rotary actuation member and a compliant coupling element. The rotary bearing member is coupled to the caliper jaw and may engage the caliper spar. The rotary actuation member is actuated by a user to apply a measuring force. The compliant coupling element is configured to compliantly couple the rotary actuation member to the rotary bearing member. Using the compliant wheel assembly, a user is able to apply a more consistent amount of measurement force than could typically be achieved with a conventional rigid thumb wheel in caliper. In one implementation, a displacement indicator may also be provided that is responsive to the rotational displacement between the rotary bearing and actuation members for indicating an amount of measurement force that is being applied.

22 Claims, 6 Drawing Sheets

(56) References Cited

U.S. PATENT DOCUMENTS

| | | | |
|---|---|---|---|
| 5,886,519 A | 3/1999 | Masreliez et al. | |
| 5,901,458 A | 5/1999 | Andermo et al. | |
| 5,973,494 A | 10/1999 | Masreliez et al. | |
| RE37,490 E | 1/2002 | Andermo et al. | |
| 6,400,138 B1 | 6/2002 | Andermo | |
| 7,246,032 B2 | 7/2007 | Feldman | |
| 7,266,906 B2 * | 9/2007 | Suzuki | G01B 3/205 33/784 |
| 7,443,159 B2 | 10/2008 | Habenschaden et al. | |
| 7,530,177 B1 | 5/2009 | Meichle et al. | |
| 7,533,474 B2 | 5/2009 | Saito et al. | |
| 8,205,510 B2 | 6/2012 | DiLuigi | |
| 8,357,120 B2 | 1/2013 | Moller et al. | |
| 8,898,923 B2 | 12/2014 | Nahum et al. | |
| 2003/0047009 A1 | 3/2003 | Webb | |
| 2011/0137967 A1 | 6/2011 | Jansson | |
| 2014/0150570 A1 * | 6/2014 | Nahum | G01L 1/00 73/862.541 |
| 2015/0059480 A1 * | 3/2015 | Dockrey | G01B 21/04 73/649 |
| 2015/0247742 A1 * | 9/2015 | Cook | G01B 3/205 33/784 |
| 2015/0276366 A1 * | 10/2015 | Emtman | G01B 3/205 33/701 |

OTHER PUBLICATIONS

U.S. Appl. No. 14/231,492, filed Mar. 31, 2014, entitled "Flexible Mount for Coupling Force Actuator to Caliper Jaw," 41 pages.

U.S. Appl. No. 14/267,666, filed May 1, 2014, entitled "Caliper Force Indicator With Tactile or Auditory Feedback," 69 pages.

U.S. Appl. No. 14/644,079, filed Mar. 10, 2015, entitled "Compliant Thumb Wheel Assembly Coupled to a Caliper Jaw," 55 pages.

* cited by examiner

WHEEL ASSEMBLY FOR MOVING CALIPER JAW WITH REPEATABLE FORCE

BACKGROUND

1. Technical Field

The invention relates to precision measurement instruments, and particularly to calipers with a movable jaw for measuring the dimensions of an object.

2. Description Related Art

Calipers are known that utilize pairs of jaws for determining measurements. A first jaw is generally fixed at one end of a measurement scale while a second jaw is attached to a slider assembly that moves along the measurement scale. An outer dimension of an object may be measured by arranging the object between and against inner surfaces of the first and second jaws. An inner dimension of an object may be measured by arranging outer surfaces of the first and second jaws between and against the inner surfaces of the object (e.g., the walls of a hole). The slider assembly may be moved with a user's thumb, and a thumb wheel may be provided for enabling controlled movement of the slider. One exemplary caliper utilizing a thumb wheel is described in U.S. Pat. No. 7,533,474, which is hereby incorporated herein by reference in its entirety.

For measuring the distance between the jaws of the caliper, electronic position encoders may be used, based on low-power inductive, capacitive, or magnetic position sensing technology. In general, such an encoder may comprise a readhead and a scale. The readhead may generally comprise a readhead sensor and readhead electronics. The readhead outputs signals that vary as a function of the position of the readhead sensor relative to the scale along a measuring axis. The scale may be affixed to an elongated scale member that includes a fixed first measuring jaw. The readhead is affixed to a slider assembly including the second measuring jaw, which is movable along the scale member. Measurements of the distance between the two measuring jaws may be determined based on the signals from the readhead.

Exemplary electronic calipers are disclosed in commonly assigned U.S. Pat. Nos. RE37490, 5,574,381, and 5,973,494, each of which is hereby incorporated by reference in its entirety. A prior art electronic caliper that is capable of measuring force is disclosed in U.S. Patent Publication No. 2003/0047009. As described in the '009 publication, one deficiency in the use of prior calipers is the variation in force which can be applied by the measuring jaws and the differences in measurement which can occur as a result. Particularly when a soft object is being measured, the measurement of the object may be unreliable or non-repeatable because one may apply either a higher force on the jaws of the caliper such that the soft object is "more compressed", or apply a lower force such that the soft object is "less compressed". The '009 publication discloses a caliper that is capable of measuring both the size and force applied to an object, which may be analyzed to provide more repeatable measurements. However, the force sensing and indicating features of the caliper of the '009 publication may be considered "overkill" in many applications, and/or may be considered too expensive and/or complex by many caliper users. A need exists for improving measurement force control and/or repeatability in a caliper in an economical, ergonomically convenient, repeatable, and intuitively understandable manner.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A wheel assembly is provided for moving a caliper jaw relative to a caliper spar with improved ability to produce a repeatable measuring force in the caliper. In one implementation, the wheel assembly includes a rotary bearing member, a rotary actuation member and a compliant coupling element. The rotary bearing member is coupled to the caliper jaw and is configured to engage the caliper spar. The rotary actuation member is configured to be actuated by a user to apply the measuring force. The compliant coupling element is configured to elastically couple the rotary actuation member to the rotary bearing member. The rotary bearing member and the rotary actuation member may be coaxial.

In various implementations, the wheel assembly may be configured such that when the rotary bearing element engages the caliper spar a rotational displacement of the rotary actuation member relative to the rotary bearing member may generate a deformation of the compliant coupling element. The deformation of the compliant coupling element may generate a force which is applied to the rotary bearing member and thereby coupled to generate a force on the caliper jaw along its direction of motion which is related to the rotational displacement. In various implementations, the compliant coupling element may consist of a component such as a torsion spring, an elastomeric torsion spring, a helical spring arranged in an arc about an axis of rotation of the wheel assembly, a flexure pivot, etc.

A rotary stop arrangement may be provided that is configured to provide a maximum rotational displacement limit between the rotary bearing member and the rotary actuation member such that deformation of the compliant coupling element is limited to substantially exclude plastic deformation of the compliant coupling element. The rotary stop arrangement may also be configured to transmit additional force between the rotary actuation member and the rotary bearing member once the maximum rotational displacement limit is reached.

In various implementations, the rotary bearing member may be coupled to a hub capture element that is connected to the caliper jaw. The hub capture element may be configured to allow the rotary bearing member to move toward the caliper spar such that a spar engagement feature of the rotary bearing member bears on (e.g., rolls on) the caliper spar, and to allow the rotary bearing member to move away from the caliper spar such that the spar engagement disengages from the caliper spar (e.g., the rotary bearing member turns freely). When the spar engagement feature is disengaged, the rotary bearing member may rotate freely with the rotary actuation member such that there is no significant rotational displacement of the rotary actuation member relative to the rotary bearing member and no significant deformation of the compliant coupling element. The spar engagement feature may include a groove having sides that frictionally engage the caliper spar.

In various implementations, the wheel assembly may include a displacement indicator that is responsive to the rotational displacement between the rotary bearing member and the rotary actuation member. The response of the displacement indicator may be indicative of a force applied to the rotary bearing member through the compliant coupling element. The displacement indicator may include at least one of a visual indicator, a tactile sensation generator that provides at least one respective tactile sensation corresponding to a respective rotational displacement, and a sound generator that provides at least one respective sound corresponding to a respective rotational displacement. In one implementation, the displacement indicator may be responsive over a rotational displacement range spanning at least 20 degrees between the rotary bearing member and the rotary actuation member.

The displacement indicator may include a pointer element coupled to the rotary bearing member and extending through a clearance opening in the rotary actuation member. In one implementation, the pointer element may be rigidly coupled to the rotary bearing member. In addition, the clearance opening may be sized such that a maximum amount of travel of the pointer element in the clearance opening may provide a maximum rotational displacement limit between the rotary bearing member and the rotary actuation member. Such a limit may substantially prevent plastic deformation of the compliant coupling element.

In various implementations, the compliant coupling element may be configured for bi-directional elastic coupling of the rotary actuation member to the rotary bearing member. In one configuration, a clockwise rotational displacement of the rotary actuation member relative to the rotary bearing member may generate a first polarity deformation of the compliant coupling element which generates a first polarity force applied to the rotary bearing member. A counter-clockwise rotational displacement of the rotary actuation member relative to the rotary bearing member may generate a second polarity deformation of the compliant coupling element which generates a second polarity force applied to the rotary bearing member. A displacement indicator may also include a first polarity portion for indicating a response to clockwise rotational displacement and a second polarity portion for indicating a response to counter-clockwise rotational displacement. In one implementation, the wheel assembly may be configured such that a change in the rotational displacement of the rotary actuation member relative to the rotary bearing member of 20 degrees may generate a related change in force of at least 0.5 newtons and at most 10 newtons on the caliper jaw along its direction of motion.

In one implementation, the wheel assembly may be configured such that it is interchangeable with a rigid thumb wheel that is supplied for use with a caliper. The wheel assembly may thus be configured to be coupled without modification to the caliper after the rigid thumb wheel has been removed. It will be appreciated that such a configuration simplifies the utilization of the wheel assembly for replacing an existing rigid thumb wheel on an existing caliper.

DETAILED DESCRIPTION

Figure 1:
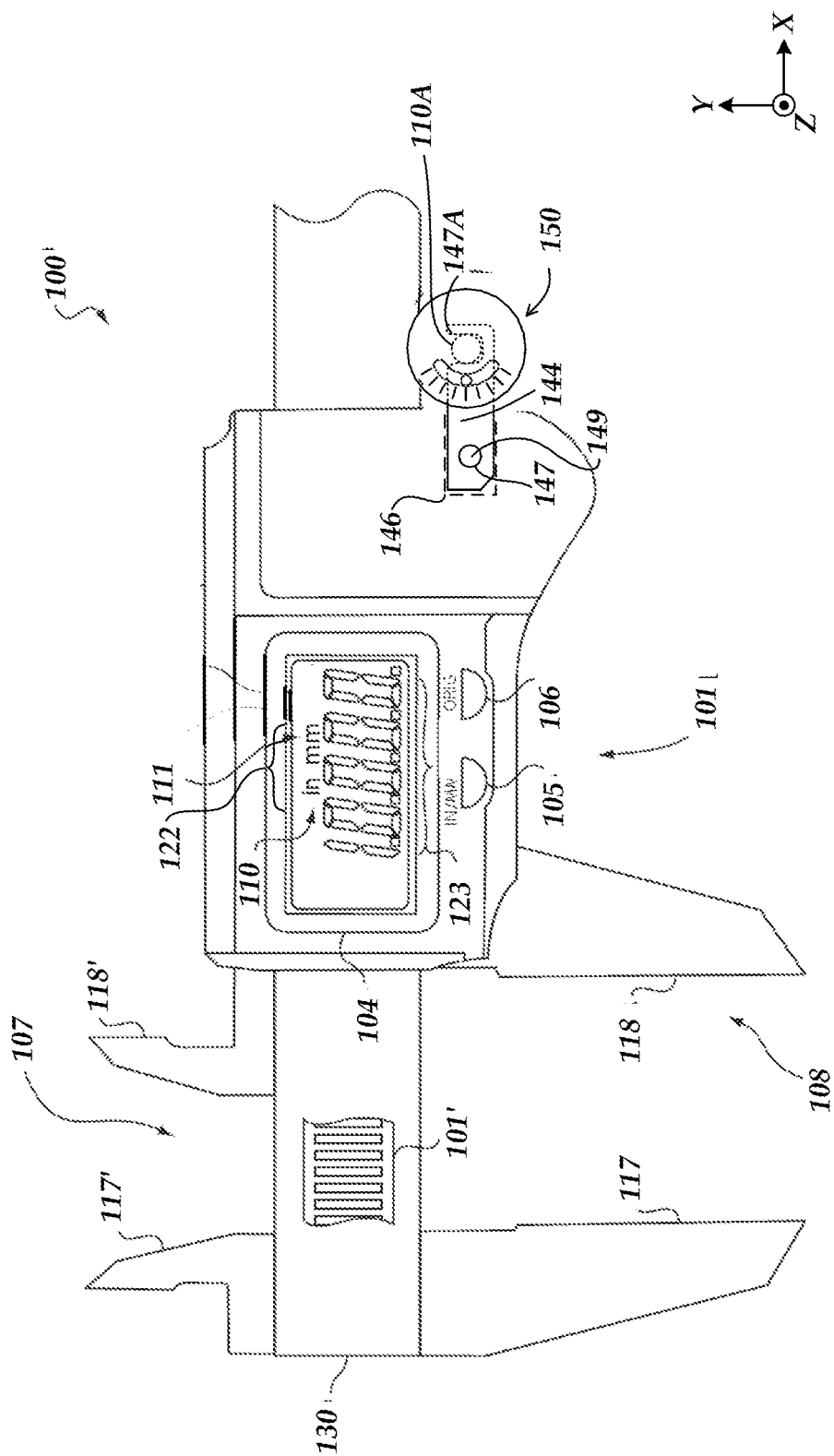
FIG. 1 is a diagram of a portion of a caliper with a first embodiment of a wheel assembly with a displacement indicator that provides visual feedback regarding an amount of applied measuring force in the caliper.

FIG. 1 shows a portion of a caliper 100 with a first embodiment of a wheel assembly 150. The caliper 100 includes a scale member 107 and a read-head member 108. The scale member 107 may be a conventional electronic caliper member comprising fixed jaw portions 117 and 117' and a spar 130 carrying a transducer scale 101', a portion of which is revealed in FIG. 1. The read-head member 108 may be a conventional electronic caliper member including jaw portions 118 and 118', a hub capture element 144 for coupling to the wheel assembly 150, and a guide and mounting portion (not shown) that aligns and guides the read-head member 108 along the spar 130 and carries a read-head assembly 101. The guide and mounting portion (as known by one of ordinary skill in the art and/or as disclosed in the incorporated references) underlies the read-head assembly 101 shown in FIG. 1, and is approximately the same size as the read-head assembly 101.

In the embodiment shown in FIG. 1, the read-head member 108 carries the transducer read-head assembly 101, also referred to simply as read-head assembly 101, which includes a display 104, a mode-selecting button 105, and an origin-selecting button 106. The read-head assembly 101 also includes a transducer read-head (not shown) that is operable to provide signals indicative of the position of the transducer read-head assembly 101 along the transducer scale 101' to a signal processing and control unit (not shown).

The display 104 generally comprises an alphanumeric measurement display portion 123 and a mode indicator display portion 122. The display may be a custom LCD display, or any other suitable type of display. The mode indicator portion 122 is capable of displaying conventional measurement mode/unit indicators such as "in" for mode indicator 110 and "mm" for mode indicator 111, which indicate units of inches and millimeters, respectively. These indicators may take any convenient written or symbolic form and are not restricted to the exemplary "in" and "mm" forms. In one embodiment, when activated, the mode-selecting button 105 selects/changes in the operating mode and/or units of measurement displayed by the caliper 100.

The illustrated embodiment of the hub capture element 144 is an elongated component that supports the wheel assembly 150. The hub capture element 144 includes a hole 147 which may operate to accept a screw or shaft 149 that pins it to the read head member 108. The hub capture element 144 includes a slot 147A that captures a hub or axle 110A included in the wheel assembly 150, such that the wheel assembly 150 may rotate in the slot 147A and may move toward and away from the spar 130 in the slot 147A, depending on a user's manual pressure or force on the wheel assembly 150. In the illustrated embodiment, the hub capture element 144 fits snugly into a clearance portion 146 in the readhead member 108. In various implementations, the hub capture element 144 and the associated components 145-149 may be located at the front of the read head member 108 or alternatively enclosed under a cover, such that primarily or only the wheel assembly 150 is visible.

To measure an outer dimension of an object, the user may close the jaw portions 117 and 118, such that their edges contact the outer surfaces of the measurement object. To measure an inner dimension of an object, the user may separate the jaw portions 117' and 118', such that their edges contact the inner surfaces of the measurement object. During measurement, the alphanumeric measurement display portion 123 is responsive to reflect the distance between the measuring edges of the jaw portions 117 and 118 or 117' and 118'. An origin or zero button can be pressed with the jaw portions 117 and 118 or 117' and 118' at a selected separation or offset distance. Thereafter, measurement values are displayed relative to that offset distance.

As will be described in more detail below with respect to FIGS. 2A-2D, 3A-3D and 4A-4C, the wheel assembly 150 is configured to engage the spar 130 when activated by a user (e.g., when pushed against the spar 130 and rotated by a user's thumb) so as to adjust the position of the read-head member 108 and its associated jaw portions 118 and 118'.

In accordance with various implementations described herein, various features of the wheel assembly 150 improve the amount of control that the user has for moving the read-head member 108, in that the wheel assembly 150 includes a compliant element to provide an improved means of tactile feedback to the user regarding the amount of measuring force exerted on the object by the jaw portions 117 and 118 or the jaw portions 117' and 118'. It should be appreciated that using a more consistent or repeatable measuring force results in more consistent or repeatable measurement results, especially for compliant workpieces. In addition, for unskilled users, a compliant wheel assembly 150 as disclosed herein may provide tactile feedback which prevents them from exerting an excessive measuring force which distorts the alignment of the jaw portion 118 (118'), and produces erroneous or non-repeatable measurements.

Figure 2B:
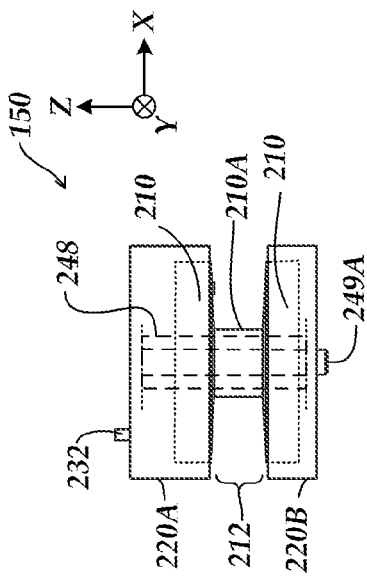
FIGS. 2A-2D are diagrams of the components of an embodiment of the wheel assembly of FIG. 1.
Figure 2C:
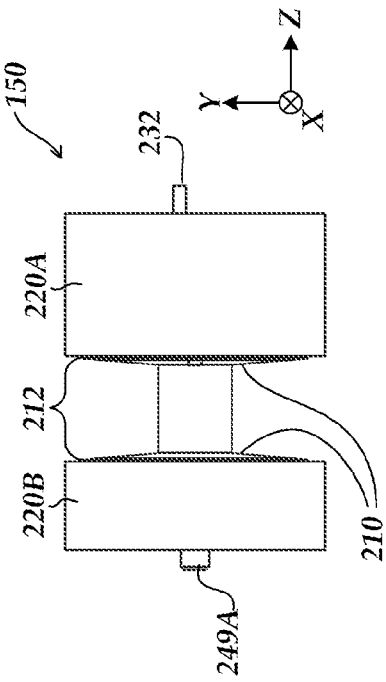
Figure 2A:
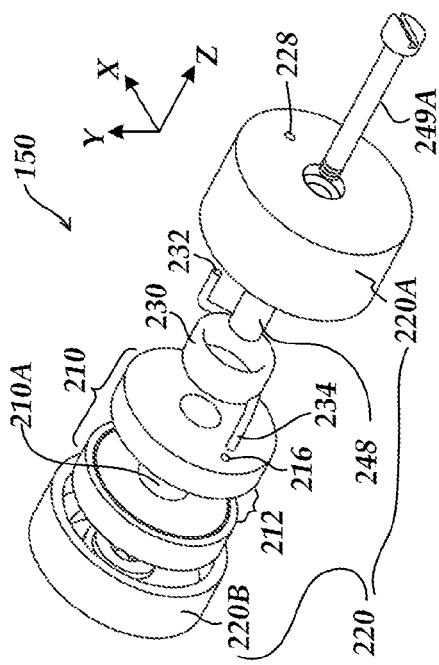

FIGS. 2A-2D are diagrams of components of one embodiment of the compliant wheel assembly 150 of FIG. 1. As shown in FIG. 2A, the wheel assembly 150 may include a rotary bearing member 210 including the hub 210A, rotary actuator portions 220A and 220B, a compliant coupling element 230, assembly screw 249A, and an optional hub/spacer 248. In various implementations, the rotary actuator portions 220A and 220B may be rigidly coupled together (e.g., against the hub/spacer 248) by the screw/axle 249A to form a single rotary actuation member 220 (e.g., an outer thumb wheel portion) that is actuated by a user to apply measuring force, as will be described in more detail below. In one embodiment, the assembly screw 249A is fastened into threads in the actuator portion 220B, and has an unthreaded length configured to provide an axial clearance between the assembled components of the wheel assembly 150, such that the rotary bearing member 210 may pivot freely relative to the actuator portions 220A and 220B after the assembly screw 249A is tightened. In one implementation, the rotary actuator portion 220A may be omitted, and the compliant coupling element 230 may be repositioned (and reconfigured if needed) to couple the rotary actuator portion 220B to the rotary bearing member 210. The screw/axle 249A, and/or the hub/spacer 248 may be reconfigured if needed, to hold the resulting assembly together in an operational manner as outlined above. The hub 210A of rotary bearing member 210 and thereby the wheel assembly 150 is coupled to the read-head member 108 and thereby the caliper jaw portion 118 through the hub capture element 144, as outlined above with reference to the hub 110A of FIG. 1.

The compliant coupling element 230 is configured to elastically couple the rotary actuation member 220 to the rotary bearing member 210. More specifically, in the embodiment of FIG. 2A, the compliant coupling element 230 is illustrated as consisting of a torsion spring with a first end portion 232 and a second end portion 234. The first end portion 232 is received in a hole 228 of the rotary actuator portion 220A, while the second end portion 234 is received in a hole of the rotary bearing member 210, so as to elastically couple the rotary actuator portion 220A to the rotary bearing member 210. While the compliant coupling element 230 is illustrated in FIG. 2A as consisting of a torsion spring, it will be appreciated that other similar components may be utilized in other implementations (e.g., an elastomeric torsion spring, a helical spring arranged in an arc about an axis of rotation of the wheel assembly, a flexure pivot, etc.)

Figure 2D:
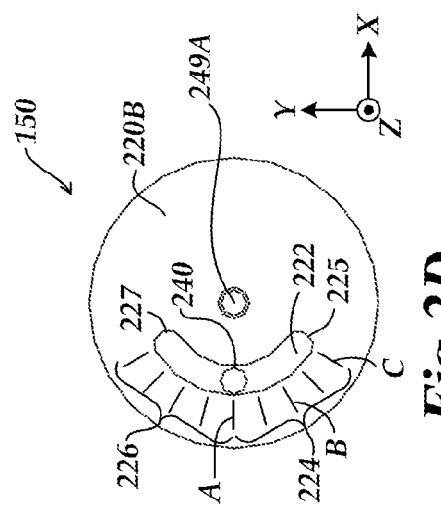

FIGS. 2B, 2C and 2D are side, top and end views, respectively, of the assembled wheel assembly 150. As illustrated in FIGS. 2B and 2C, the end portion 232 of the compliant coupling element 230 may extend through the hole 228 of the rotary actuator portion 220A. The assembly screw 249A is shown to be centrally located along the axis of rotation of the wheel assembly 150. The central portion of the rotary bearing member 210 (located between the rotary actuator portions 220A and 220B in the assembled representation) is shown to include a spar engagement feature 212 which consists of a groove having sides that are intended to frictionally engage the caliper spar 130, as will be described in more detail below with respect to FIGS. 3A-3D.

As will also be described in more detail below, when the spar engagement feature 212 engages the caliper spar 130, a displacement indicator 240 may indicate an amount of torque and/or resultant measuring force being applied due to the rotation of the actuation member 220 (220B) of the wheel assembly 150. As shown in FIG. 2D, in one implementation the displacement indicator 240 may consist of a pointer element (e.g., a pin attached to the side of the rotary bearing member 210) which extends through a clearance opening 222 (e.g., an arc-shaped hole) in the side of the rotary actuator portion 220B. The displacement indicator 240, shown at a rest or disengaged position corresponding to zero measuring force (and/or disengagement of the rotary bearing member 210 from the caliper spar 130), is configured to operate in conjunction with first and second polarity portions, which may correspond to first and second ranges 224 and 226. More specifically, the first range 224 may be for a torque or force used during the measurement of an outer dimension of an object wherein outer surfaces of the object are contacted by the caliper jaw portions 117 and 118, while the second range 226 may be for a torque or force used during measurement of an inner dimension of an object wherein inner surfaces of the object are contacted by the caliper jaw portions 117' and 118'. In one implementation, graduated markings may be included for indicating positions within the respective ranges 224 and 226. As will be described in more detail below with respect to FIGS. 4A-4C, a set of graduated markings A, B and C may correspond to the beginning, middle and end, respectively, of the range 224.

Figure 3A:
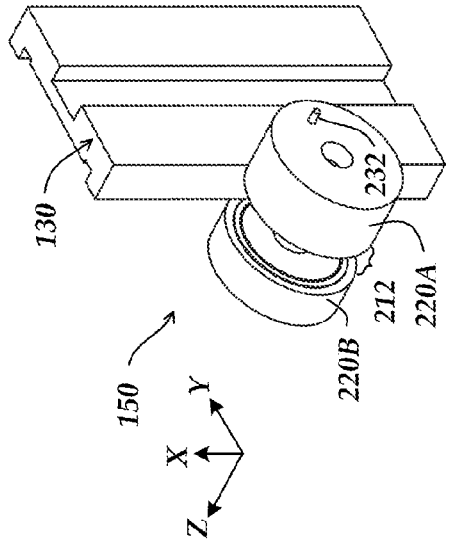
FIGS. 3A-3D are diagrams of the components of FIGS. 2A-2D engaging a caliper spar.

FIGS. 3A-3D are diagrams of the assembled wheel assembly 150 as engaging a caliper spar 130 (e.g., as being pushed by the thumb of a user). As shown in FIG. 3A, the spar engagement feature 212 of the rotary bearing member 210 is illustrated as engaging the caliper spar 130. In this configuration, a rotational displacement of the rotary actuation member 220 (e.g., as pushed by a thumb of a user) relative to the rotary bearing member 210 (which resists the rotation due to the frictional force of the spar engagement feature 212 engaging the spar 130 and pushing the jaw portion 118 to compress an object that is being measured) generates a deformation of the compliant coupling element 230, allowing the rotary actuation member 220 and the rotary bearing member 210 to rotate relative to one another. The deformation of the compliant coupling element 230 generates a corresponding force which is applied to the rotary bearing member 210 and is thereby coupled to generate a force on the caliper jaw portion 118 (or 118'), through the coupling of the hub capture element 144 shown in FIG. 1, along its direction of motion which is related to the rotational displacement.

Figure 3B:
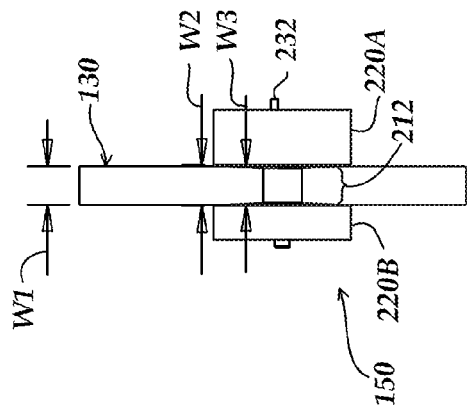
Figure 3C:
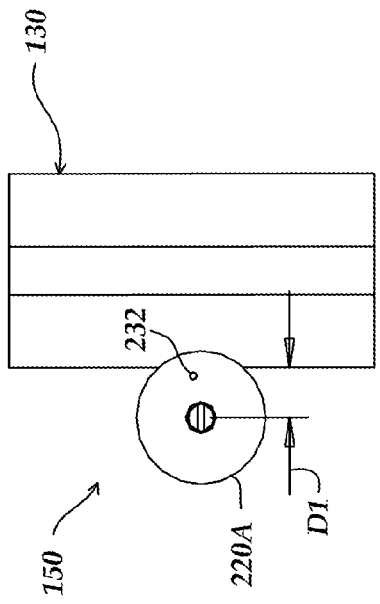
Figure 3D:
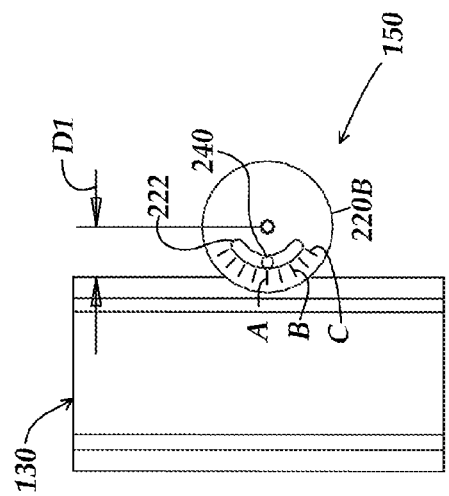

FIG. 3B is a side view of the wheel assembly 150, and FIGS. 3C and 3D are end views directed toward the rotary actuator portions 220A and 220B, respectively. As shown in FIG. 3B, the spar engagement feature 212 includes a groove having sides that are tapered inward and which frictionally engage the caliper spar 130 as the wheel assembly 150 is pushed toward the caliper spar 130 (e.g., such as by a user's thumb). In one specific example implementation, the caliper spar 130 may have a width W1 of approximately 3.50 mm. Correspondingly, an outer portion of the spar engagement feature 212 (i.e., near the outer edge of the rotary bearing member 210) may have a groove width W2 of approximately 3.70 mm (for providing clearance for allowing the spar 130 to be initially slid into the outer portion of the groove). In contrast, the central portion of the spar engagement feature 212 (i.e., near the central hub 210A) between the sides as they are tapered inward may have a groove width W3 of approximately 3.48 mm (for allowing the tapered sides to frictionally engage the spar 130 as it is slid further into the groove). As shown in FIGS. 3C, when the spar 130 is frictionally engaged in the groove of the spar engagement feature 212, the edge of the spar 130 may be separated from the central axis of the wheel assembly 150 by a distance D1 of approximately 4.12 mm.

As shown in FIG. 3D, the displacement indicator 240 is at the graduated marking A, which may correspond to a "zero" position in the middle between the ranges 224 and 226 of the clearance opening 222. As previously outlined, this condition may exist when the wheel assembly 150 is first pushed inward to engage the caliper spar 130 and before rotational force is applied (e.g., by the user's thumb) to move the read-head member 108 and the associated caliper jaw portions 118 and 118' to apply measurement force to an object that is being measured. This "zero" position of the displacement indicator 240 also exists when the wheel assembly 150 is disengaged from the caliper spar. As will be described in more detail below with respect to FIGS. 4A-4C, when an object is being measured, the displacement indicator 240 may provide an indication of the amount of force that is being applied on the object by the jaws of the caliper 100.

With regard to the operation of the wheel assembly 150 as it engages and disengages to and from the caliper spar 130, the rotary bearing member 210 is coupled to the hub capture element 144 (FIG. 1) that is connected to the read-head member 108 and the associated caliper jaw portions 118 and 118'. The hub capture element 144 is configured to allow the rotary bearing member 210 to move toward the caliper spar 130 such that the spar engagement feature 212 bears on the caliper spar 130, as illustrated in FIGS. 3A-3D. The hub capture element 144 is also configured to allow the rotary bearing member 210 to move away from the caliper spar 130 (e.g., when the wheel assembly 150 is not being pushed by a user's thumb) such that the spar engagement feature 212 of the rotary bearing member 210 disengages from the caliper spar 130. The wheel assembly 150 is configured such that when the spar engagement feature 212 is disengaged from the caliper spar 130, the rotary bearing member 210 is able to rotate freely with the rotary actuation member 220 such that there is no significant rotational displacement of the rotary actuation member 220 relative to the rotary bearing member 210 and no significant deformation of the compliant coupling element 230.

In contrast, as described above with respect to FIG. 3A, when the wheel assembly 150 is pushed toward the caliper spar 130 (e.g., by a user's thumb), the spar engagement feature 212 engages the caliper spar 130, and further rotation of the rotary actuation member 220 (e.g., by the user's thumb) to apply measurement force to an object that is being measured generates a deformation of the compliant coupling element 230. The deformation of the compliant coupling element 230 generates a force which is applied to the rotary bearing member 210 and is thereby coupled to generate a force on the caliper jaw portion 118 (or 118'), through the coupling of the hub capture element 144 shown in FIG. 1, along its direction of motion which is related to the rotational displacement.

In the implementation of FIGS. 2A-2D and 3A-3D, the compliant coupling element 230 is configured for bi-directional elastic coupling of the rotary actuation member 220 to the rotary bearing member 210. In such a configuration, a clockwise rotational displacement of the rotary actuation member 220 relative to the rotary bearing member 210 generates a first polarity deformation of the compliant coupling element 230 which generates a first polarity force applied to the rotary bearing member 210. Furthermore, a counterclockwise rotational displacement of the rotary actuation member 220 relative to the rotary bearing member 210 generates a second polarity deformation of the compliant coupling element 230 which generates a second polarity force applied to the rotary bearing member 210. In one implementation, these first and second polarity forces are generated at least in part according to the physical properties of the compliant coupling element 230 (e.g., a torsion spring) for the clockwise or counterclockwise rotational displacements, respectively.

As shown in FIGS. 2D and 3D, the displacement indicator 240 is correspondingly configured to operate in conjunction with the range 224 of the first polarity portion for indicating a response to counter-clockwise rotational displacement and the range 226 of the second polarity portion for indicating a response to clockwise rotational displacement. In one implementation, the range 224 may be for the measurement of an outer dimension of an object wherein outer surfaces of the object are contacted by the caliper jaw portions 117 and 118, while the range 226 is for the measurement of an inner dimension of an object wherein inner surfaces of the object are contacted by the caliper jaw portions 117' and 118'. Examples for a measurement of an outer dimension of an object utilizing the range 224 will be described in more detail below with respect to FIGS. 4A-4C.

In various implementations, the ends of the clearance opening 222 at the end of the ranges 224 and 226 may function as rotary stop arrangements 225 and 227, respectively. More specifically, the rotary stop arrangements 225 and 227 may be configured to provide a maximum rotational displacement limit between the rotary bearing member 210 and the rotary actuation member 220 such that deformation of the compliant coupling element 230 is limited to substantially exclude plastic deformation of the compliant coupling element 230. The rotary stop arrangements 225 and 227 may also be configured to transmit additional force between the rotary actuation member 220 and the rotary bearing member 210 once the maximum rotational displacement limit is reached. In other words, once the displacement indicator 240 (e.g., consisting of a pin attached to the side of the rotary bearing member 210) reaches either the rotary stop arrangement 225 or 227, additional rotation of the rotary actuation member 220 in the corresponding direction may result in a correspondingly fixed rotation of the rotary bearing member 210. This occurs due to the displacement indicator pin 240 being pressed against the rotary stop arrangement 225 or 227 at the end of the clearance opening 222 for fixably rotating the rotary bearing member 210 with the rotary actuation member 220 without causing further deformation of the compliant coupling element 230, and thus preventing plastic deformation of the compliant coupling element 230.

Figure 4A:
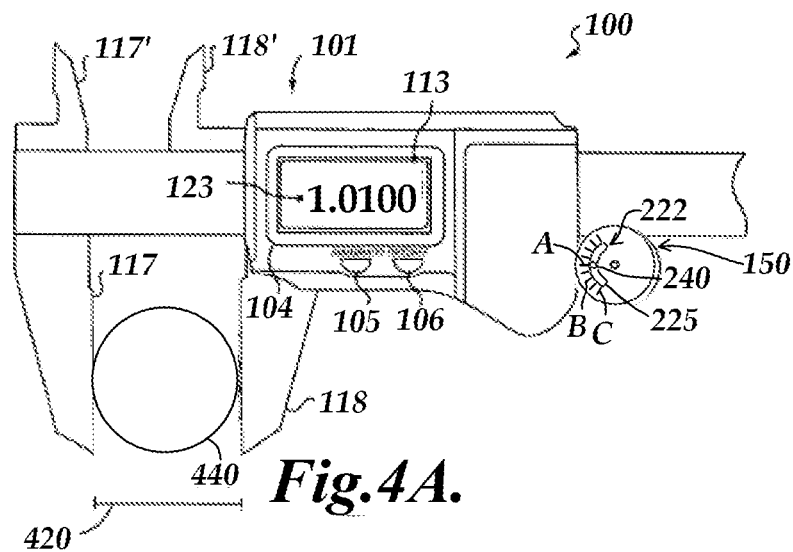
FIGS. 4A-4C are diagrams illustrating operations of the caliper and wheel assembly of FIG. 1 for measuring an object.
Figure 4B:
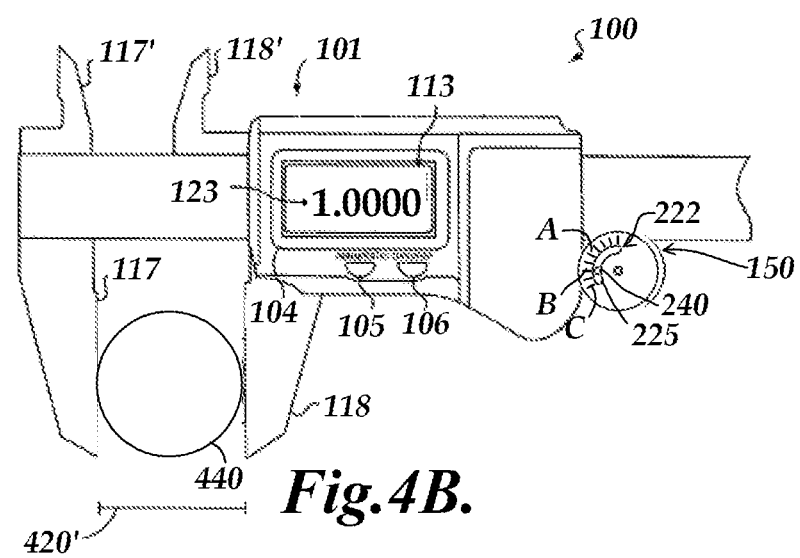
Figure 4C:
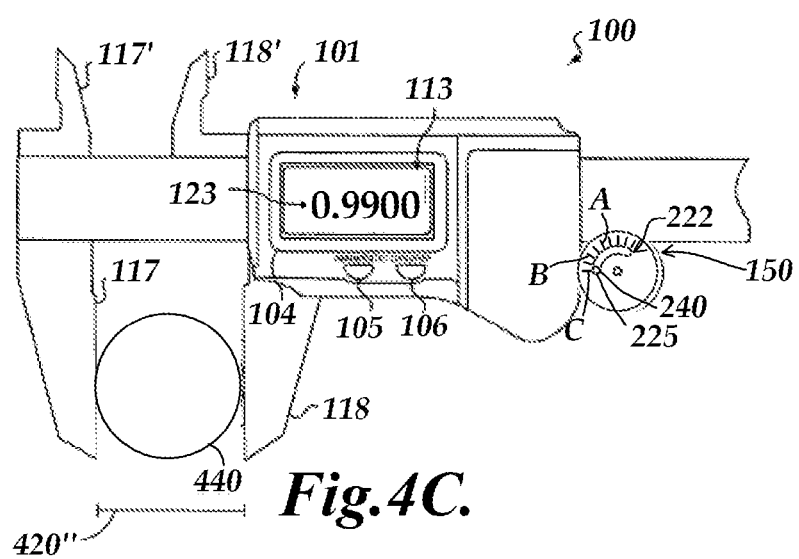

FIGS. 4A-4C are diagrams illustrating operations of the caliper 100 and wheel assembly 150 of FIG. 1 for measuring the outer dimensions of an object 440. In the embodiments of FIGS. 4A-4C, the hub capture element 144 for coupling to the wheel assembly 150 is hidden behind an outer cover of the read-head member 108. As shown in FIG. 4A, the jaw portions 117 and 118 have been moved (e.g., by a user) such that their respective measuring edges are either very near or only just in contact with the outer surfaces of the measurement object 440. In this configuration, very little or no force may yet be applied to compress the object 440 between the jaw portions 117 and 118 of the caliper 100. As such, the displacement indicator 240 of the wheel assembly 150 is positioned with the displacement indicator 240 at the graduated marking A which corresponds to a "zero" position in the middle between the ranges 224 and 226 (see FIG. 2D) of the clearance opening 222. This condition may exist before the wheel assembly 150 has been pushed to engage the caliper spar 130 or also when the wheel assembly 150 is first pushed to engage the caliper spar 130 and before rotational force is applied (e.g., by the user's thumb) to move the read-head member 108 and the associated caliper jaw portion 118 to compress the object 440. The width of the object 440 between the jaw portions 117 and 118 is indicated according to a dimension 420, which corresponds to a reading on the alphanumeric measurement display portion 123 of "1.0100" (e.g., which may correspond to selected measurement units, such as inches, millimeters, etc.)

FIG. 4B illustrates a configuration in which a user's thumb has pushed the actuation member 220 of the wheel assembly 150 toward the caliper spar 130, and further rotation of the rotary actuation member 220 by the user's thumb has generated a deformation of the compliant coupling element 230. The deformation of the compliant coupling element 230 generates a force which is applied to the rotary bearing member 210 and is thereby coupled to generate a force on the jaw portion 118, through the coupling of the hub capture element 144 (shown in FIG. 1), along its direction of motion which is related to the rotational displacement. In this configuration, a desired amount of measurement force is being applied to compress the object 440 between the jaw portions 117 and 118 of the caliper 100. As such, the displacement indicator 240 of the wheel assembly 150 is at the graduated marking B which may correspond to a mid-range position in the middle of the range 224 (see FIG. 2D) of the clearance opening 222. The width of the object 440 between the jaw portions 117 and 118 is indicated according to a dimension 420', which corresponds to a reading on the alphanumeric measurement display portion 123 of "1.0000".

In this specific illustrative example, the reading of "1.0000" may correspond to a previously determined "accurate" measurement of the object 440, and may correspond to a desirable amount of measurement force and minimal compression of the object 440 between the jaw portions 117 and 118 for obtaining the measurement. It will be appreciated that while in this specific illustrative example the desired amount of measurement force is indicated as corresponding to the graduated marking B, in other implementations other markings may be utilized for a desired amount of measurement force. For example, in various implementations the components of the caliper 100 may be configured for applying different amounts of measurement force (e.g., low force calipers, etc.) and different measurement objects may be more or less compliant (i.e., compressible) for which different amounts of measurement force may be appropriate. In one specific example implementation, the wheel assembly 150 may be configured such that a change in the rotational displacement of the rotary actuation member 220 relative to the rotary bearing member 210 of 20 degrees may generate a related change in force of at least 0.5 newtons and at most 10 newtons on the caliper jaw portion 118 (or 118') along its direction of motion. For any of the different potential configurations and settings, it will generally be appreciated that by keeping the amount of measurement force that is applied at a consistent level for the measurements of similar objects, a more consistent comparison between the measurements of the similar objects may be achieved.

FIG. 4C illustrates a configuration in which further rotation of the rotary actuation member 220 by the user's thumb has generated an additional deformation of the compliant coupling element 230. In this configuration, an undesirably excessive amount of measurement force is being applied to compress the object 440 between the jaw portions 117 and 118 of the caliper 100. As such, the displacement indicator 240 of the wheel assembly 150 is at the graduated marking C which may correspond to an end-of-range position at or near the end of the range 224 (see FIG. 2D) of the clearance opening 222. The width of the object 440 between the jaw portions 117 and 118 is indicated according to a dimension 420", which corresponds to a reading on the alphanumeric measurement display portion 123 of "0.9900". As noted above, in this specific illustrative example this configuration indicates that the object 440 is being compressed too tightly between the jaw portions 117 and 118. As such, the object 440 has been compressed beyond the "accurate" dimension of "1.0000" which can result in the inaccurate measurement of "0.9900" and/or potentially cause damage to the object 440.

It will be appreciated that while in the specific illustrative examples of FIGS. 4A-4C the displacement indicator 240 does not have a significant range of motion as compared to the clearance opening 222 which rotates around it, in other implementations there may be a greater range of motion for the displacement indicator 240. In other words, in the configuration of FIGS. 4A-4C, the displacement indicator 240 moves with the rotary bearing member 210, for which additional rotation corresponds to the compression of the object 440. If the object is relatively compressible, the rotary bearing member 210 may rotate over a larger range, and the attached displacement indictor 240 may correspondingly move further for a given amount of rotation of the rotary actuation member 220 and corresponding deformation of the compliant coupling element 230.

FIGS. 5A-5D are diagrams of a second embodiment of a wheel assembly 550 in which a displacement indicator is not included. It will be appreciated that the components of the wheel assembly 550 may be similar or identical to the similarly numbered components of the wheel assembly 150 of FIGS. 2A-2D, and will be understood to operate in the same manner except as otherwise described below. As shown in FIGS. 5A-5D, the wheel assembly 550 includes a rotary bearing member 210, a rotary actuation member 220, and a compliant coupling element 230.

Figure 5B:
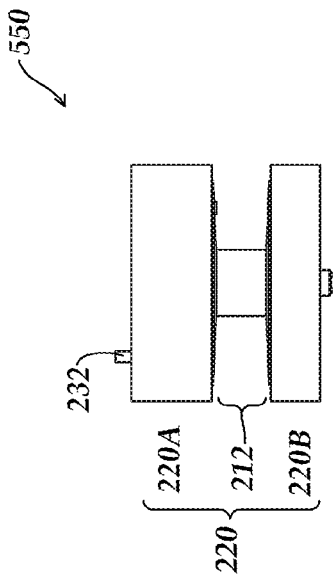
FIGS. 5A-5D are diagrams of a second embodiment of a wheel assembly in which a displacement indicator is not utilized.
Figure 5C:
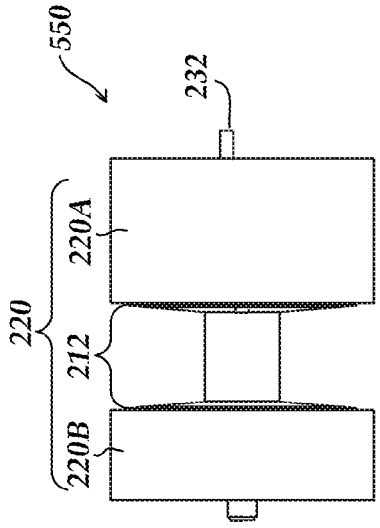
Figure 5A:
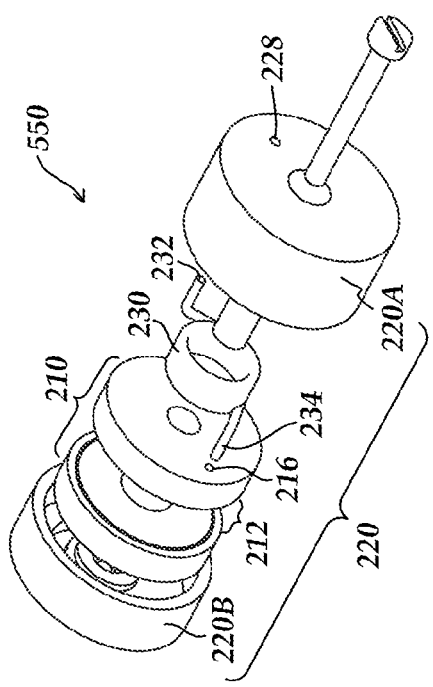
Figure 5D:
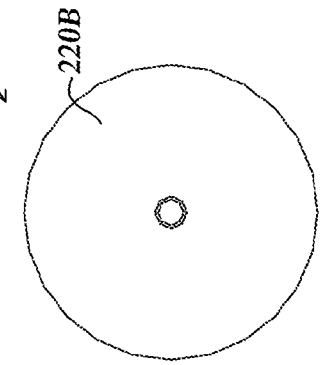

The primary difference of the wheel assembly 550 as compared to the wheel assembly 150 is the lack of a displacement indicator. As shown in FIG. 5D (as compared to FIG. 2D), the outer surface of the rotary actuator portion 220B does not include a clearance opening or a visual displacement indicator. Instead, only the amount of rotation of the rotary actuation member 220 and the manually sensed (tactile) resistance provided by the compliant coupling element 230 as it applies force to turn the rotary bearing member 210 provide feedback to the user.

It will be appreciated that the required amount of rotation and force for the utilization of the wheel assembly 550 (or 150) is advantageous over prior methods using a rigid thumb wheel in a traditional caliper. In particular, the combination of the rotary bearing member 210, the rotary actuation member 220, and the compliant coupling element 230 provide a greater range of rotation for a given range of force in comparison to a rigid thumb wheel that allows for greater control by a user's thumb than a rigid thumb wheel. More specifically, with a rigid thumb wheel, all of the rotational force from a user's thumb is directly and immediately applied as measurement force (e.g., similar to if the rotary bearing member 210 were being directly rotated by the user's thumb). In addition, a very small degree of rotation results in a sharp change in the applied measurement force against a hard workpiece for a rigid thumb. In contrast, for the compliant wheel assembly 550, a small degree of rotation results in a small change in the applied measurement force against a hard workpiece. A user can therefore easily apply a more repeatable measuring force and/or detect an excessive measuring force associated with feeling the compliant element reaching the end of its travel (e.g., associated with a rotary stop arrangement as outlined above.)

As a further illustrative example, a user may become familiar with a configuration in which a proper amount of measurement force is applied after rotating the rotary actuation member 220 by a specific amount (e.g., 45 degrees). This may be in contrast to a rigid thumb wheel, where a proper amount of measurement force may be applied over a much smaller degree of rotation (e.g., 10 degrees or less), which may be much more difficult for the user to precisely control with the movement of the user's thumb over such a small range of motion. Through the utilization of the wheel assembly 550 (or 150), the user is thus better able to control and repeat the amount of measurement force that is applied for the measurement of an object.

Figure 6:
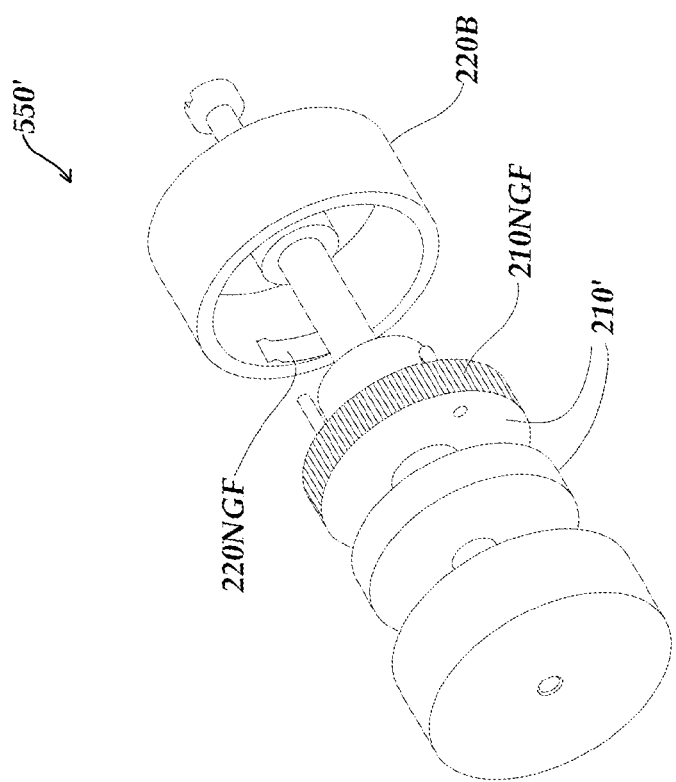
FIG. 6 is a diagram of a third embodiment of a wheel assembly in which a displacement indicator provides auditory or tactile feedback regarding an amount of applied measuring force in a caliper.

FIG. 6 is a diagram of a third embodiment of a wheel assembly 550' in which an auditory and/or tactile displacement indicator provides auditory and/or tactile feedback (e.g., a clicking) related to a changing or target amount of applied measuring force in a caliper. It will be appreciated that the components of the wheel assembly 550' may be similar or identical to the similarly numbered components of the wheel assembly 550 of FIGS. 5A-5D, and will be understood to operate in the same manner except as otherwise described below. As shown in FIG. 6, the rotary bearing member 210' includes a schematically represented noise generating feature 21ONGF (e.g., ridges, knurling, holes, bumps, etc.) and the rotary actuation member 220 includes a schematically represented cooperating noise generating feature 22ONGF (e.g., a spring member including a raised portion that clicks over elements of the noise generating feature 21ONGF during relative motion).

In operation, a user may determine that a proper amount of measurement force is being applied when a certain number of clicks are reached.

As a specific illustrative example, a user may determine that a proper amount of measurement force is being applied when a second click is reached, wherein a first click indicates that too little measurement force is yet being applied, and a third click indicates that too much measurement force is being applied. In some embodiments, the noise generating feature 21ONGF may include just one element that is positioned to generate a click at a target or standard measuring force of each measuring polarity. It will be appreciated that these examples are exemplary only and not limiting. The noise generating features may be positioned differently and take other forms than those outlined above, as will be appreciated by one of ordinary skill in the art based on this disclosure.

In various implementations, any of the above described wheel assemblies, with or without a displacement indicator, may be configured such that they are interchangeable with a rigid thumb wheel that is supplied for use with a traditional caliper. The wheel assembly may thus be configured to be coupled without modification to the caliper after the rigid thumb wheel has been removed. It will be appreciated that such a configuration simplifies the utilization of any of the above described wheel assemblies for replacing an existing rigid thumb wheel on an existing caliper.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A wheel assembly for moving a caliper jaw relative to a caliper spar with improved user feedback regarding applied measuring force in a caliper, the wheel assembly comprising:
 a rotary bearing member coupled to the caliper jaw and configured to engage the caliper spar;
 a rotary actuation member configured to be actuated by a user to apply the measuring force; and
 a compliant coupling element configured to elastically couple the rotary actuation member to the rotary bearing member;
 wherein the wheel assembly is configured such that when the rotary bearing member engages the caliper spar a rotational displacement of the rotary actuation member relative to the rotary bearing member generates a deformation of the compliant coupling element which generates a force which is applied to the rotary bearing member and thereby coupled to generate a force on the caliper jaw along its direction of motion which is related to the rotational displacement.

2. The wheel assembly of claim 1, wherein the rotary bearing member is coupled to a hub capture element that is connected to the caliper jaw.

3. The wheel assembly of claim 2, wherein the hub capture element is configured to allow the rotary bearing member to move toward the caliper spar such that a spar engagement feature of the rotary bearing member bears on the caliper spar, and to allow the rotary bearing member to move away from the caliper spar such that the spar engagement feature of the rotary bearing member disengages from the caliper spar.

4. The wheel assembly of claim 3, wherein the spar engagement feature comprises a groove having sides that frictionally engage the caliper spar.

5. The wheel assembly of claim 3, wherein the wheel assembly is configured such that when the spar engagement feature is disengaged from the caliper spar, the rotary bearing member may rotate freely with the rotary actuation member such that there is no significant rotational displacement of the rotary actuation member relative to the rotary bearing member and no significant deformation of the compliant coupling element.

6. The wheel assembly of claim 1, further comprising a displacement indicator that is responsive to the rotational displacement between the rotary bearing member and the rotary actuation member.

7. The wheel assembly of claim 6, wherein the response of the displacement indicator is indicative of the force applied to the rotary bearing member through the compliant coupling element.

8. The wheel assembly of claim 6, wherein:
the compliant coupling element is configured for bi-directional elastic coupling of the rotary actuation member to the rotary bearing member, such that a clockwise rotational displacement of the rotary actuation member relative to the rotary bearing member generates a first polarity deformation of the compliant coupling element which generates a first polarity force applied to the rotary bearing member, and a counter-clockwise rotational displacement of the rotary actuation member relative to the rotary bearing member generates a second polarity deformation of the compliant coupling element which generates a second polarity force applied to the rotary bearing member; and
the displacement indicator includes a first polarity portion for indicating a response to clockwise rotational displacement and a second polarity portion for indicating a response to counter-clockwise rotational displacement.

9. The wheel assembly of claim 6, wherein the displacement indicator is responsive over a rotational displacement range spanning at least 20 degrees between the rotary bearing member and the rotary actuation member.

10. The wheel assembly of claim 6, wherein the displacement indicator comprises at least one of a visual indicator responsive to the rotational displacement, a tactile sensation generator that provides at least one respective tactile sensation corresponding to a respective rotational displacement, and a sound generator that provides at least one respective sound corresponding to a respective rotational displacement.

11. The wheel assembly of claim 6, wherein the displacement indicator comprises a pointer element which is coupled to the rotary bearing member and which extends through a clearance opening in the rotary actuation member.

12. The wheel assembly of claim 11, wherein the pointer element and the clearance opening furthermore provide a rotary stop arrangement wherein the pointer element is rigidly coupled to the rotary bearing member and the clearance opening is sized such that a maximum amount of travel of the pointer element in the clearance opening provides a maximum rotational displacement limit between the rotary bearing member and the rotary actuation member such that deformation of the compliant coupling element is limited to substantially exclude plastic deformation of the compliant coupling element.

13. The wheel assembly of claim 1, further comprising a rotary stop arrangement configured to provide a maximum rotational displacement limit between the rotary bearing member and the rotary actuation member such that deformation of the compliant coupling element is limited to substantially exclude plastic deformation of the compliant coupling element.

14. The wheel assembly of claim 13, wherein the rotary stop arrangement is configured to transmit additional force between the rotary actuation member and the rotary bearing member once the maximum rotational displacement limit is reached.

15. The wheel assembly of claim 1, wherein the wheel assembly is configured such that a change in the rotational displacement of the rotary actuation member relative to the rotary bearing member of 20 degrees generates a related change in force of at least 0.5 newtons and at most 10 newtons on the caliper jaw along its direction of motion.

16. The wheel assembly of claim 1, wherein the wheel assembly is configured such that it is interchangeable with a rigid thumb wheel that is supplied for use with the caliper, such that the wheel assembly may be coupled without modification to the caliper after the rigid thumb wheel has been removed.

17. The wheel assembly of claim 1, wherein the rotary bearing member and the rotary actuation member are coaxial.

18. The wheel assembly of claim 1, wherein the compliant coupling element comprises at least one of a torsion spring, an elastomeric torsion spring, a helical spring arranged in an arc about an axis of rotation of the wheel assembly, or a flexure pivot.

19. A method for applying a measuring force in a caliper, the method comprising:
moving a caliper jaw along a direction of motion such that reference surfaces of the caliper contact a workpiece to be measured;
operating a wheel assembly while the reference surfaces of the caliper contact the workpiece to be measured, the wheel assembly comprising:
a rotary bearing member coupled to the caliper jaw and configured to engage a caliper spar,
a rotary actuation member configured to be actuated to apply the measuring force, and
a compliant coupling element configured to elastically couple the rotary actuation member to the rotary bearing member,
wherein the wheel assembly is configured such that when the rotary bearing member engages the caliper spar a rotational displacement of the rotary actuation member relative to the rotary bearing member generates a deformation of the compliant coupling element which generates a force which is applied to the rotary bearing member and thereby coupled to generate a force on the caliper jaw along its direction of motion which is related to the rotational displacement;
the operating of the wheel assembly including:
operating the wheel assembly such that the rotary bearing member engages the caliper spar; and
operating the wheel assembly, while the rotary bearing member engages the caliper spar, to provide a rotational displacement of the rotary actuation member relative to the rotary bearing member in order to generate a force on the caliper jaw along its direction of motion that depends on the rotational displacement of the rotary actuation member relative to the rotary bearing member.

20. The method of claim 19, further including stopping rotation of the rotary actuation member once a displacement indicator indicates a desired level of measuring force is being applied and keeping the rotary actuation member in a constant position while a measurement is determined.

21. The method of claim 20, wherein the displacement indicator comprises at least one of a visual indicator responsive to the rotational displacement, a tactile sensation generator that provides at least one respective tactile sensation corresponding to a respective rotational displacement, and a sound generator that provides at least one respective sound corresponding to a respective rotational displacement.

22. The method of claim 20, wherein the displacement indicator comprises a pointer element which is coupled to the rotary bearing member and which extends through a clearance opening in the rotary actuation member.

* * * * *